US012449052B1

(12) United States Patent
Felgar et al.

(10) Patent No.: US 12,449,052 B1
(45) Date of Patent: Oct. 21, 2025

(54) BIDIRECTIONAL EXCESS FLOW VALVE

(71) Applicant: Watts Regulator Co., North Andover, MA (US)

(72) Inventors: Mark E. Felgar, New Stanton, PA (US); Matthew W. Riggle, Ford City, PA (US)

(73) Assignee: Watts Regulator Co., North Andover, MA (US)

( * ) Notice: Subject to any disclaimer, the term of this patent is extended or adjusted under 35 U.S.C. 154(b) by 73 days.

(21) Appl. No.: 18/638,008

(22) Filed: Apr. 17, 2024

(51) Int. Cl.
*F16K 17/26* (2006.01)
*F16L 15/00* (2006.01)

(52) U.S. Cl.
CPC ............. *F16K 17/26* (2013.01); *F16L 15/006* (2013.01); *Y10T 137/7785* (2015.04)

(58) Field of Classification Search
CPC .......... F16K 17/20; F16K 17/24; F16K 17/26; F16K 17/36; Y10T 137/7777; Y10T 137/7783; Y10T 137/7785; Y10T 137/7838; Y10T 137/7846; Y10T 137/7869
USPC ....................................................... 137/498
See application file for complete search history.

(56) References Cited

U.S. PATENT DOCUMENTS

| 2,121,936 | A |   | 6/1938 | Thomas |                     |
|-----------|---|---|--------|--------|---------------------|
| 3,085,589 | A | * | 4/1963 | Sands  | ........ A62C 4/02  |
|           |   |   |        |        | 251/363             |
| 3,561,471 | A | * | 2/1971 | Sands  | ........ F16K 17/26 |
|           |   |   |        |        | 137/460             |
| 3,683,957 | A | * | 8/1972 | Sands  | ........ F16K 17/26 |
|           |   |   |        |        | 137/460             |
| 3,904,111 | A |   | 9/1975 | Petersson |                  |
| 4,072,159 | A |   | 2/1978 | Kurosawa |                   |
| 4,811,756 | A | * | 3/1989 | Hall   | ........ F16L 55/10 |
|           |   |   |        |        | 137/513.5           |

(Continued)

FOREIGN PATENT DOCUMENTS

EP     2413110 A1   2/2012
GB     2192692 A1   1/1988

(Continued)

OTHER PUBLICATIONS

Watts Smart Sense, "Excess Flow & Thermal Shutoff Valve", Apr. 11, 2021, 3 pages.

(Continued)

*Primary Examiner* — Robert K Arundale
(74) *Attorney, Agent, or Firm* — Day Pitney LLP; George Chaclas; Anthony A. Kassas

(57) ABSTRACT

A bidirectional excess flow valve for automatically stopping delivery of a fluid from a supply in a fluid network. The valve has a housing defining an interior forming a fluid passageway along a flow axis between a first opening and a second opening. The valve also has a valve seat in the interior, the fluid passageway extending through the valve seat, and a first and second shutoff element disposed on opposite sides of the valve seat. The shutoff elements are set apart from the valve seat assembly in an open position to allow flow through the fluid passageway. In a closed position, the first or second shutoff element is configured to move against the valve element assembly to close the fluid passageway when flow through the fluid passageway exceeds a predetermined level.

9 Claims, 11 Drawing Sheets

(56) References Cited

U.S. PATENT DOCUMENTS

| | | | |
|---|---|---|---|
| 5,062,448 A * | 11/1991 | Hilsenbeck | F16K 17/26 |
| | | | 137/504 |
| 5,365,963 A | 11/1994 | Hoffmann | |
| 6,789,567 B2 | 9/2004 | Meyer | |
| 9,506,573 B2 * | 11/2016 | Schmidt | F16K 11/056 |
| D776,428 S | 1/2017 | Grebinoski et al. | |
| 11,016,514 B2 * | 5/2021 | Hart | G05D 16/02 |
| 2013/0025724 A1 | 1/2013 | Grebinoski et al. | |
| 2023/0021842 A1 * | 1/2023 | Chandrashekar | F16K 17/0473 |

FOREIGN PATENT DOCUMENTS

| | | |
|---|---|---|
| JP | 2004156707 A | 6/2004 |
| JP | 2004245305 A | 9/2004 |
| JP | 2006057875 A | 3/2006 |
| JP | 2015113859 A | 6/2015 |

OTHER PUBLICATIONS

Dormont, F-D SuprSense 1130, "Excess Flow Valve", 2014, 2 pages.

Maxitrol, "Plug1 Gas Outlet", https://controltrends.org/wp-content/uploads/2010/10/Maxitrol-PLUG1.UG_.EN_.06.2006.pdf, 2006, 1 page.

* cited by examiner

BIDIRECTIONAL EXCESS FLOW VALVE

FIELD OF THE DISCLOSURE

The subject disclosure relates to excess flow valves that are bidirectional.

BACKGROUND

In the realm of excess flow valves, the current state of the art is characterized by the prevalent use of unidirectional valves. These valves serve a crucial role in fluid transport systems, particularly in scenarios where the sudden increase in flow could signify a dangerous rupture or breach. However, the limitation inherent in existing excess flow valves is indeed their unidirectional nature. Traditionally, these valves are designed to permit flow in only one direction, providing a safeguard against excessive fluid discharge. Yet, this unidirectional characteristic presents challenges in applications where bidirectional flow may be required or anticipated.

SUMMARY

An issue in the related art revolves around the desire to supply excess flow valves that can be connected from either end. The present disclosure aims to build upon the existing state of the art, introducing novel bidirectional excess flow valve designs specifically tailored to applications like natural gas systems, ensuring both safety and operational efficiency.

Recognizing the broader context of fluid transport systems, there is a growing emphasis on the need to streamline the manufacturing of excess flow valves. Efficient manufacturing processes are essential for widespread adoption, cost-effectiveness, and seamless integration into various fluid transport applications. The related art has seen attempts to simplify manufacturing techniques, balancing the intricacies of valve design with the imperative to optimize production. As the demand for enhanced safety and efficiency continues to drive innovation, the present disclosure seeks to contribute by not only addressing bidirectionality concerns but also by streamlining the manufacturing of excess flow valves for increased accessibility and applicability in diverse fluid transport environments.

An embodiment of the subject technology includes a bidirectional excess flow valve for automatically stopping delivery of a fluid from a supply in a fluid network. The bidirectional excess flow valve has a housing defining an interior forming a fluid passageway along a flow axis between a first opening and a second opening. The bidirectional excess flow valve further includes a valve seat in the interior, the fluid passageway extending through the valve seat, and a valve element assembly. The valve element assembly includes a first shutoff element and a second shutoff element disposed on opposite sides of the valve seat. The first and second shutoff elements are normally biased set apart from the valve seat assembly in an open position to allow flow through the fluid passageway. In a first closed position, the first shutoff element is configured to move against the valve element assembly to close the fluid passageway when flow through the fluid passageway from the first opening to the second opening exceeds a first predetermined level. In a second closed position, the second shutoff element is configured to move against the valve element assembly to close the fluid passageway when flow through the fluid passageway from the second opening to the first opening exceeds a second predetermined level.

The first shutoff element may define a first convex exterior surface, the second shutoff element may define a second convex exterior surface, and the valve seat may define a first concave seat surface opposing a second concave seat surface with the first convex exterior surface facing the first concave exterior surface and the second convex exterior surface facing the second concave exterior surface.

The valve element assembly may include a clasping mechanism configured to snap fit the first and second shutoff elements together. The clasping mechanism may include a first pair of opposing deflectable first arms extending from the first shutoff element, each first arm having a distal hook and an intermediate boss defining a first capture hollow adjacent the first shutoff element, and a second pair of opposing deflectable second arms extending from the second shutoff element. Each second arm may have a distal hook and an intermediate boss defining a second capture hollow adjacent the second shutoff element so that the distal hooks of the first pair are selectively captured in the second capture hollow and the distal hooks of the second pair are selectively captured in the first capture hollow.

The first and second pair of arms may form radially outward curved surfaces that approximately form part of a circle in transverse cross-section. Further, the valve seat may include a central ring defining a central opening through which the fluid passageway and the first and second pair of arms extend. The central ring guides axial motion of the valve element assembly by the central opening being approximately a same size as the circle.

The bidirectional excess flow valve may further include a first spring extending between the valve seat assembly and the first shutoff element to bias the first shutoff element in the open position, and a second spring extending between the valve seat assembly and the second shutoff element to bias the second shutoff element in the open position, wherein the ring serves as a stop for the first and second springs.

The valve seat may be formed of an ethylene co-polymer-based material that expands at high temperature to close the fluid passageway.

An embodiment of the subject technology includes an excess flow valve for automatically stopping delivery of a fluid from a supply in a fluid network. The excess flow valve includes a housing defining an interior forming a fluid passageway along a flow axis between a first opening and a second opening. The excess flow valve also includes a valve seat fixed in the interior and forming a central opening, wherein the fluid passageway extends through the central opening. Further, the excess flow valve has a valve element including a first shutoff element for selectively sealing against the valve seat to block the fluid passageway, and at least two arms extending from the first shutoff element through the central opening. The at least two arms are: retained in the central opening by distal hooks on each arm and sized and configured to guide axial motion of the valve element. Further, the excess flow valve has a spring extending between the valve seat and valve element for normally biasing the valve element away from the valve seat in an open position to allow flow through the fluid passageway. In a first closed position, the first shutoff element is configured to move against the valve element assembly to close the fluid passageway when flow through the fluid passageway from the first opening to the second opening exceeds a first predetermined level.

In other embodiments, the valve seat may have an interior axial surface with a central ring secured therein, the central ring defining the central opening and capturing the distal hooks. Further, the valve element may include a second shutoff element for selectively sealing against the valve seat to block the fluid passageway having at least two arms extending from the second shutoff element through the central opening. The at least two arms of the second shutoff element may have distal hooks for coupling to the first shutoff element and the at least two arms of the second shutoff element are sized and configured to guide axial motion of the valve element. Further, the excess flow valve may have a second spring extending between the valve seat and second shutoff element for normally biasing the second shutoff element away from the valve seat in an open position to allow flow through the fluid passageway. In a second closed position, the second shutoff element may be configured to move against the valve element assembly to close the fluid passageway when flow through the fluid passageway from the second opening to the first opening exceeds a second predetermined level.

In other embodiments, each of the arms may have a boss that forms a capture hollow to snap fit the first and second shutoff elements together. The at least two arms may form radially outward curved surfaces that approximately form part of a circle in transverse cross-section. The valve seat may be formed of an ethylene co-polymer-based material that expands at high temperature to close the fluid passageway.

An embodiment of the subject technology includes an excess flow valve for automatically stopping delivery of a fluid from a supply in a fluid network. The excess flow valve includes a housing defining an interior forming a fluid passageway along a flow axis, and a valve seat fixed in the interior and forming a central opening, wherein the fluid passageway extends through the central opening. The excess flow valve includes a first and second shutoff element for selectively sealing against the valve seat to block the fluid passageway. The first and second shutoff elements are connected together by a clasping mechanism and retained in the central opening. Further, the first and second shutoff elements are sized and configured to guide axial motion of the valve element. The excess flow valve includes two springs extending between the valve seat and each shutoff element for normally biasing the shutoff elements away from the valve seat in an open position to allow flow through the fluid passageway. In a closed position, the first or second shutoff element is configured to move against the valve element assembly to close the fluid passageway when flow through the fluid passageway exceeds a predetermined level.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1:
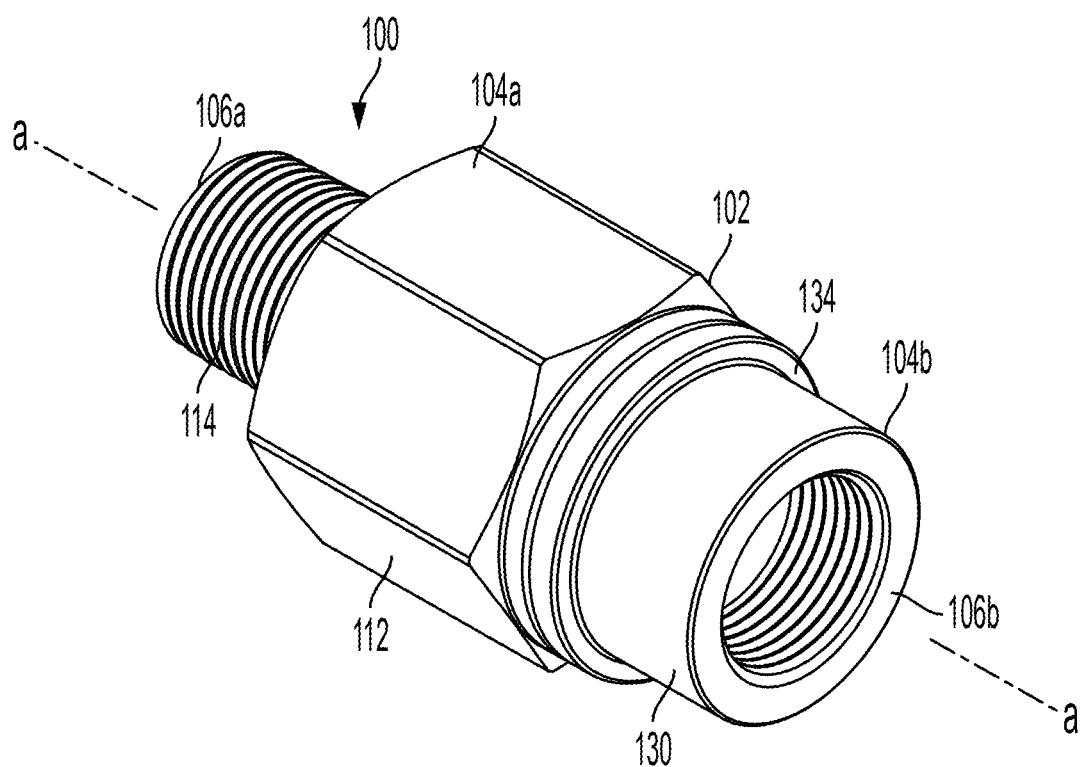
FIG. 1 shows a perspective view of a bidirectional excess flow valve for automatically stopping delivery of a fluid from a supply in a fluid network in accordance with the subject technology.

The subject technology overcomes many of the prior art problems associated with excess flow valves. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Referring now to FIG. 1, a perspective view of a bidirectional excess flow valve 100 for automatically stopping delivery of a fluid from a supply in a fluid network is shown. The valve 100 is normally open. However, the valve 100 is configured to move into a first closed position when flow through the valve 100 in a first direction exceeds a first predetermined level. The valve 100 is also configured to move into a second closed position when flow through the valve 100 in a second direction exceeds a second predetermined level. Thus, whichever way the valve 100 is installed, the valve 100 will serve to stop flow in an excess flow condition, i.e., the valve 100 is reversible.

The bidirectional excess flow valve 100 has a housing 102 formed by two mating housing portions 104a-b. The first housing portion 104a, or the female housing portion 104a as referred to herein, defines an inlet 106a for connecting to a male external connection of a fluid network (not shown) and alternatively serving as an outlet. The second housing portion 104b, or the male housing portion 104b as referred to herein, defines an outlet 106b also for connecting to a female external connection of a fluid network and alternatively functioning as an inlet. As shown, the inlet 106a and the outlet 106b are simply threaded to engage a traditional fitting.

Figure 2:
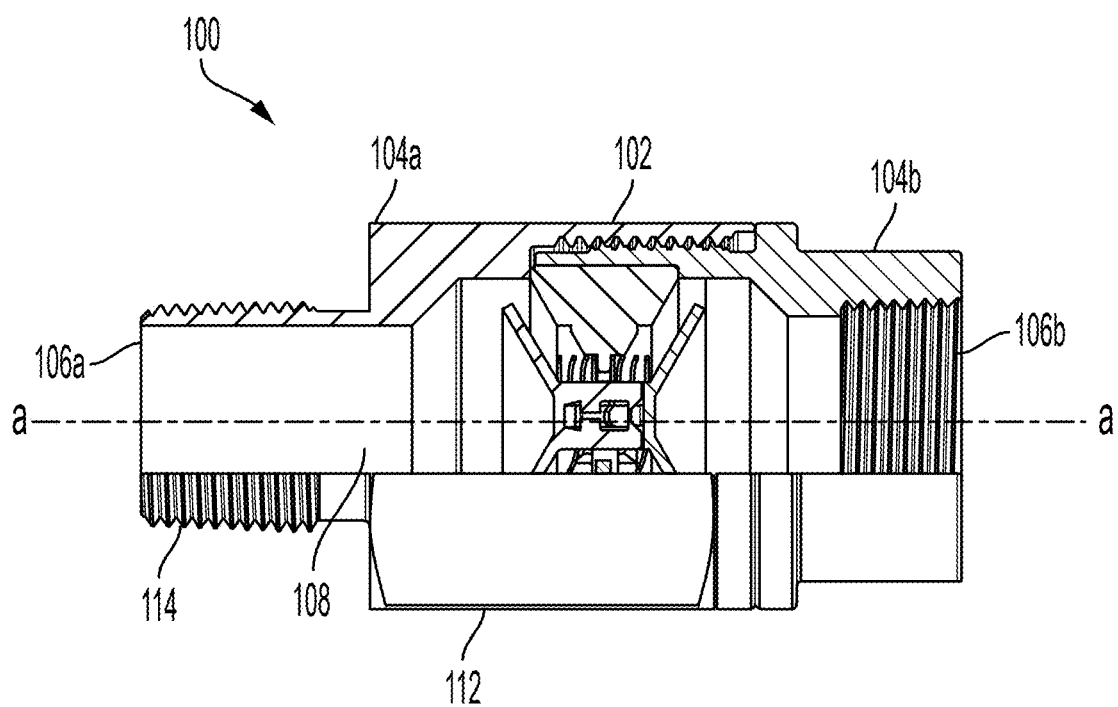
FIG. 2 shows a partial cross-sectional side view of a bidirectional excess flow valve in accordance with the subject technology.
Figure 3:
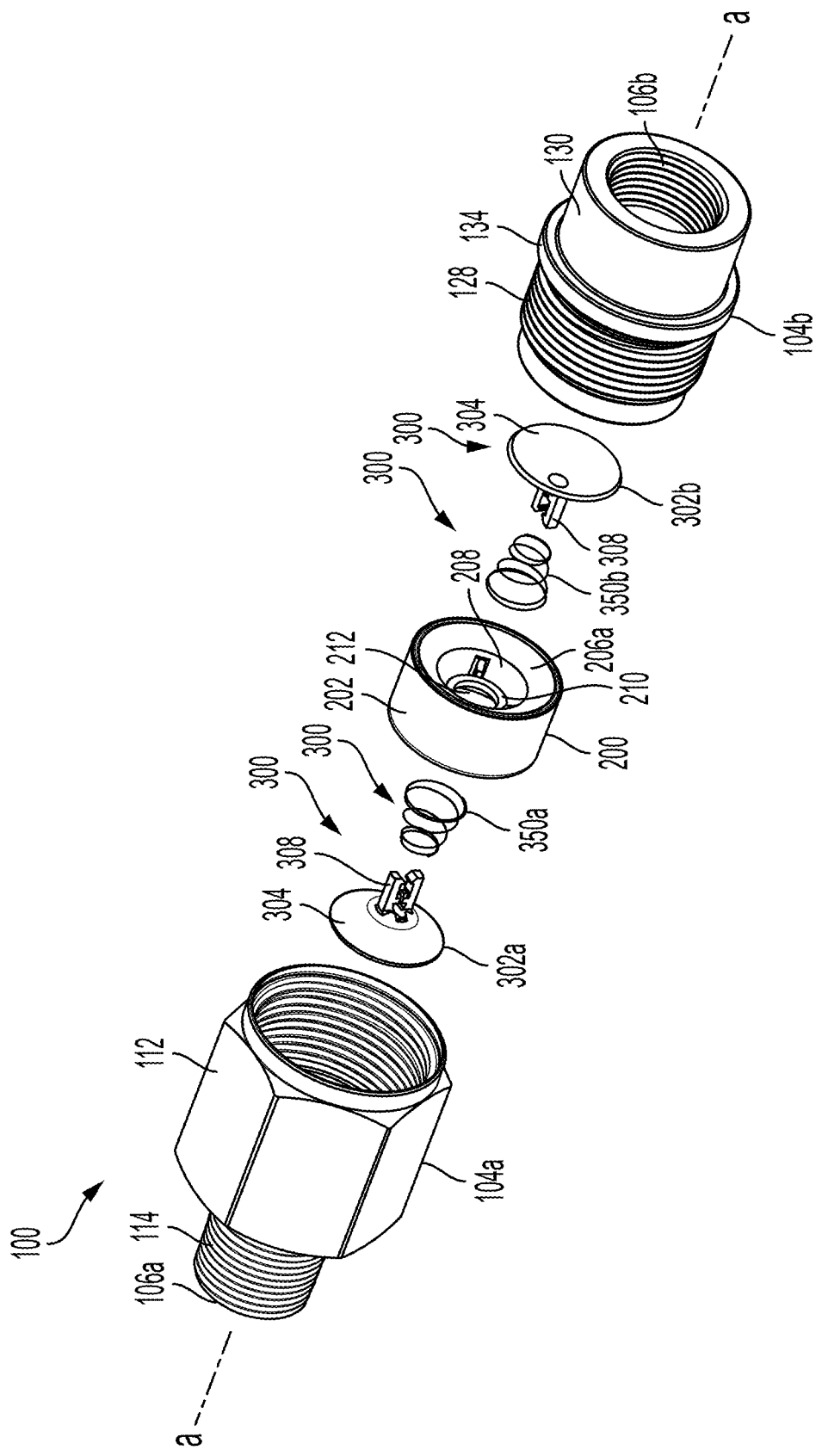
FIG. 3 shows an exploded view of a bidirectional excess flow valve in perspective in accordance with the subject technology.

Referring additionally to FIGS. 2 and 3, a cross-sectional, plan view and an exploded, perspective view of the bidirectional excess flow valve 100 of FIG. 1 are shown. When assembled, the housing 102 defines an interior 108 having a fluid passageway along a flow axis "a" between the inlet 106a and the outlet 106b. It is envisioned that the housing 102, particularly the inlet 106a and the outlet 106b, could be adapted (e.g., coupled to a nipple), reconfigured (e.g., changed from male to female and vice versa), and rearranged (e.g., oriented at an angle such as 90 degrees) for inclusion in any desired network.

Figure 4B:
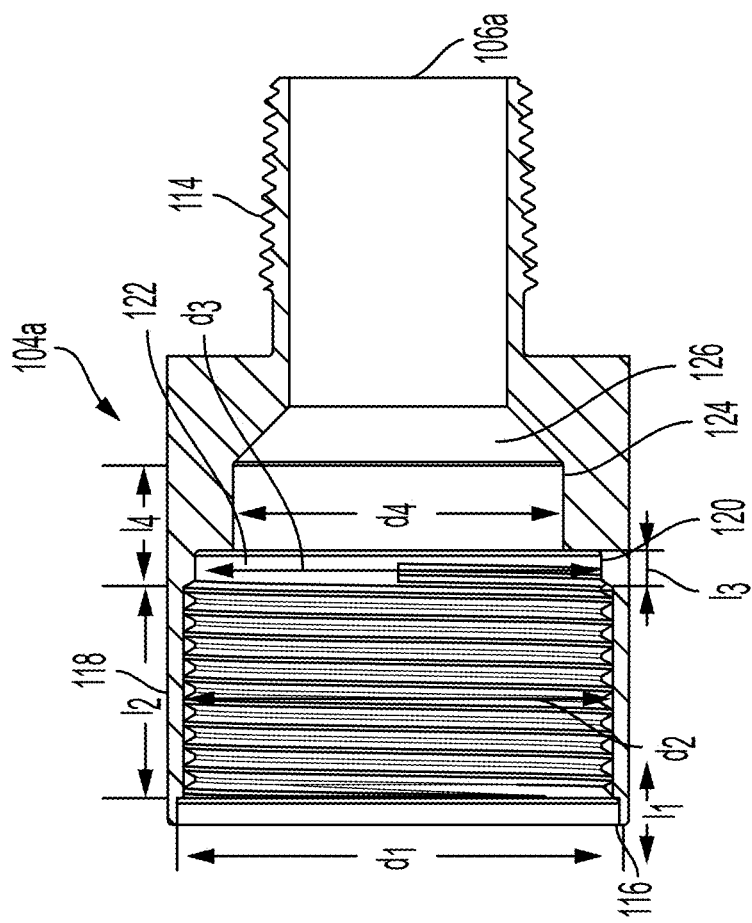
FIGS. 4A and 4B show a female portion of a housing for the bidirectional excess flow valve in an isolated, partially transparent, perspective view and a cross-sectional plan view in accordance with the subject technology.
Figure 4A:
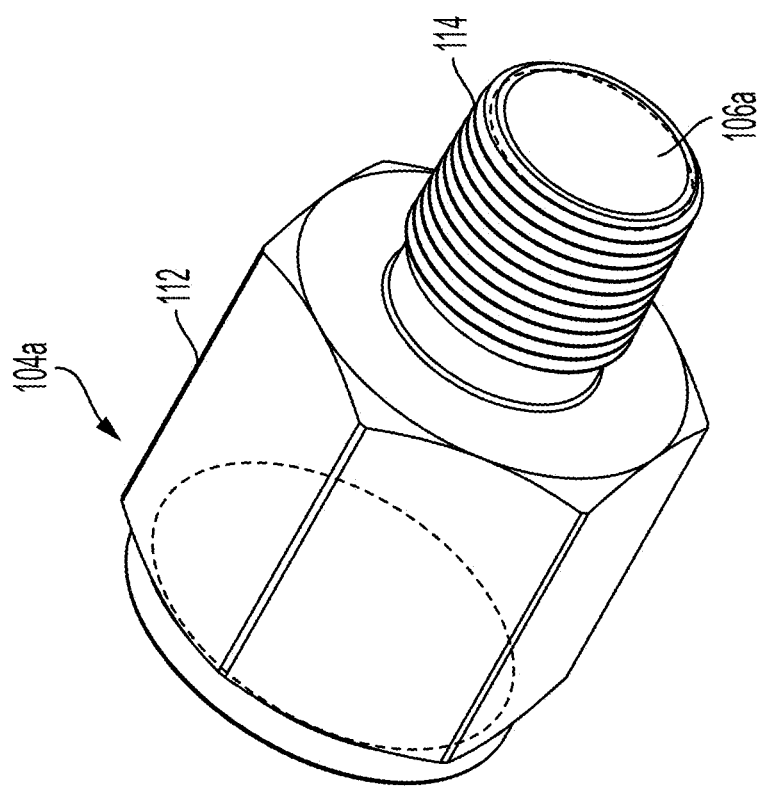

FIGS. 4A and 4B show the female portion 104a of the housing 102 for the bidirectional excess flow valve 100 isolated in a perspective view and a cross-sectional, plan view respectively. The female housing portion 104a includes a hexagonal exterior section 112 for aiding in gripping and turning by a wrench or socket during assembly. Extending from the hexagonal exterior section 112 is a threaded distal shank 114 for connection to an external fluid network. The distal shank 114 defines the inlet 106a.

Specifically referring to FIG. 4B, the hexagonal exterior section 112 has a proximal opening 116 extending for a length $l_1$ and having a first inner diameter $d_1$. The proximal opening 116 is disposed adjacent a threaded interior proximal region 118 with a second inner diameter $d_2$ for coupling to the male housing portion 104b. The interior proximal region 118 extends for a length $l_2$ before reaching a shoulder 120 and shoulder region 122. The shoulder region 122 has a third inner diameter $d_3$ and length $l_3$ before again stepping down to an intermediate region 124 having a fourth inner diameter $d_4$. The intermediate region 124 extends for a length $l_4$ before transitioning down to a neck region 126, which is angled relative to the proximal opening 116, interior proximal region 118, shoulder region 120, and intermediate region 124. The neck region 126 extends to the inlet 106a.

Figure 5B:
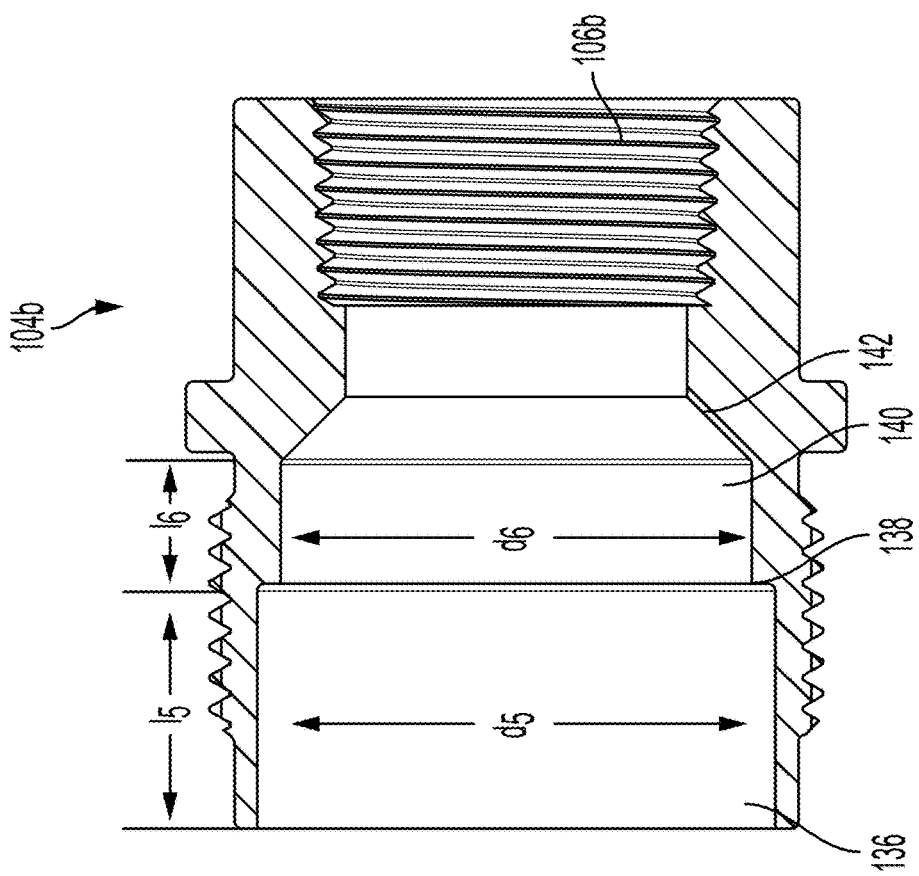
FIGS. 5A and 5B show a male portion of a housing for the bidirectional excess flow valve in an isolated perspective view and a cross-sectional plan view, respectively in accordance with the subject technology.
Figure 5A:
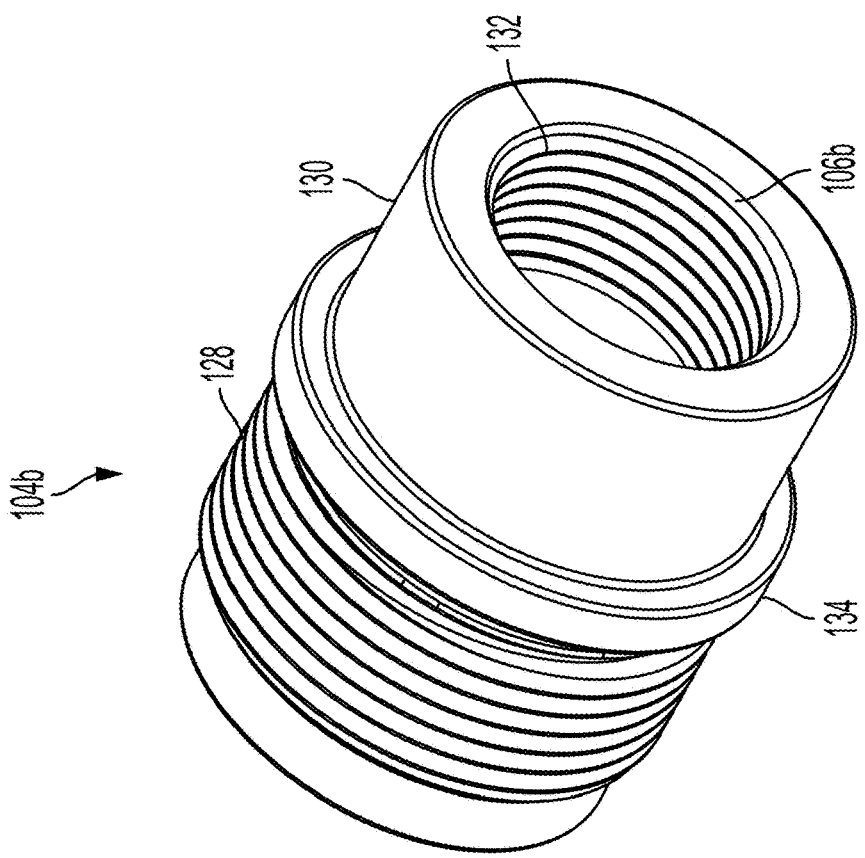

FIGS. 5A and 5B show the male portion 104b of the housing 102 for the bidirectional excess flow valve 100 isolated in a perspective view and a cross-sectional, plan view, respectively. The male housing portion 104b characterizes a threaded exterior section 128 for insertion and assembly with the interior proximal region 118 of the female housing portion 104a. A smooth exterior section 130 defines the outlet 106b and has interior threads 132 for fitting with an external fluid network. The threaded and smooth cylindrical exterior sections 128, 130 are partitioned by a central flange 134.

Specifically referring to FIG. 5B, similar to the female portion 104a of the housing 102, the male portion 104b has a corresponding interior proximal region 136 having a fifth inner diameter $d_5$. The proximal region 136 extends for a length $l_5$ before reaching a shoulder 138, the shoulder 138 then stepping down to an intermediate region 140 having a sixth inner diameter $d_6$. The intermediate region 140 extends for a length $l_6$ before transitioning down in a neck region 142 which is angled relative to the proximal 136 and intermediate 140 regions. The neck region 142 eventually reaches the outlet 106b, which is internally threaded for connection to an external fluid network.

Referring again to FIG. 3, the bidirectional excess flow valve 100 also includes a valve seat 200 for fixed positioning between the intermediate region 124 of the female portion 104a and the intermediate region 140 of the male portion 104b of the housing 102. The fluid passageway and flow axis a extends through the valve seat 200.

Figure 6A:
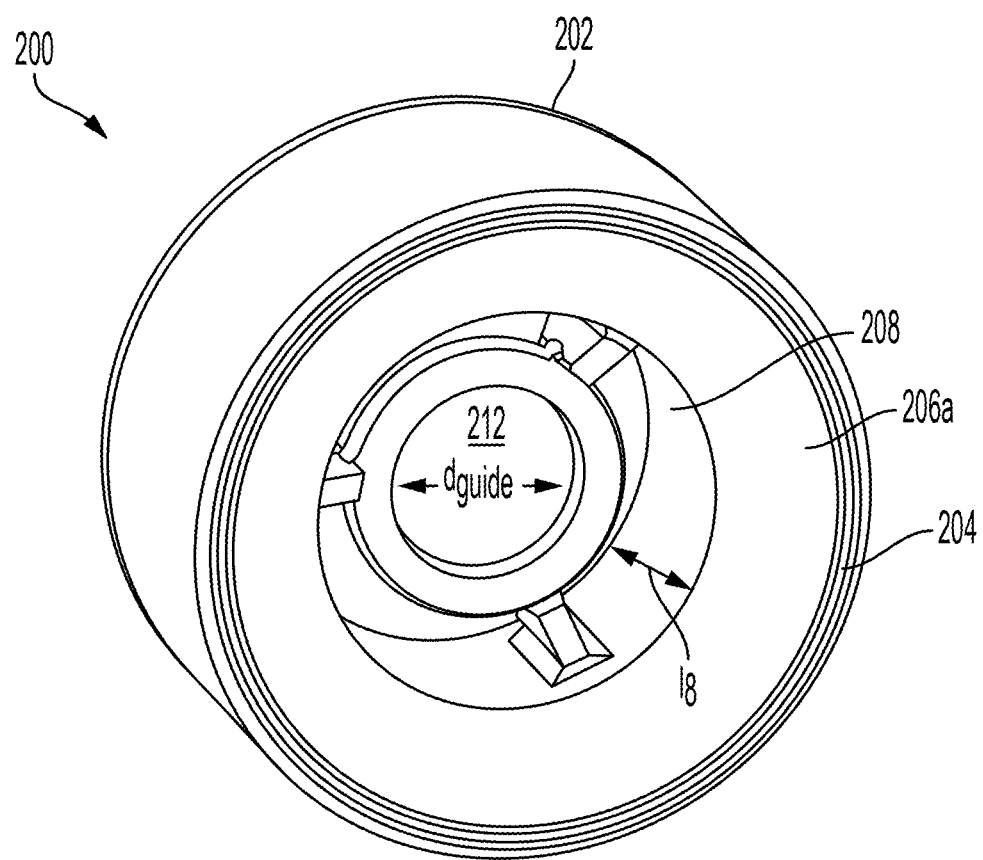
FIGS. 6A-C show a valve seat assembly of the bidirectional excess flow valve represented in isolated perspective, plan, and cross-sectional views in accordance with the subject technology.
Figure 6C:
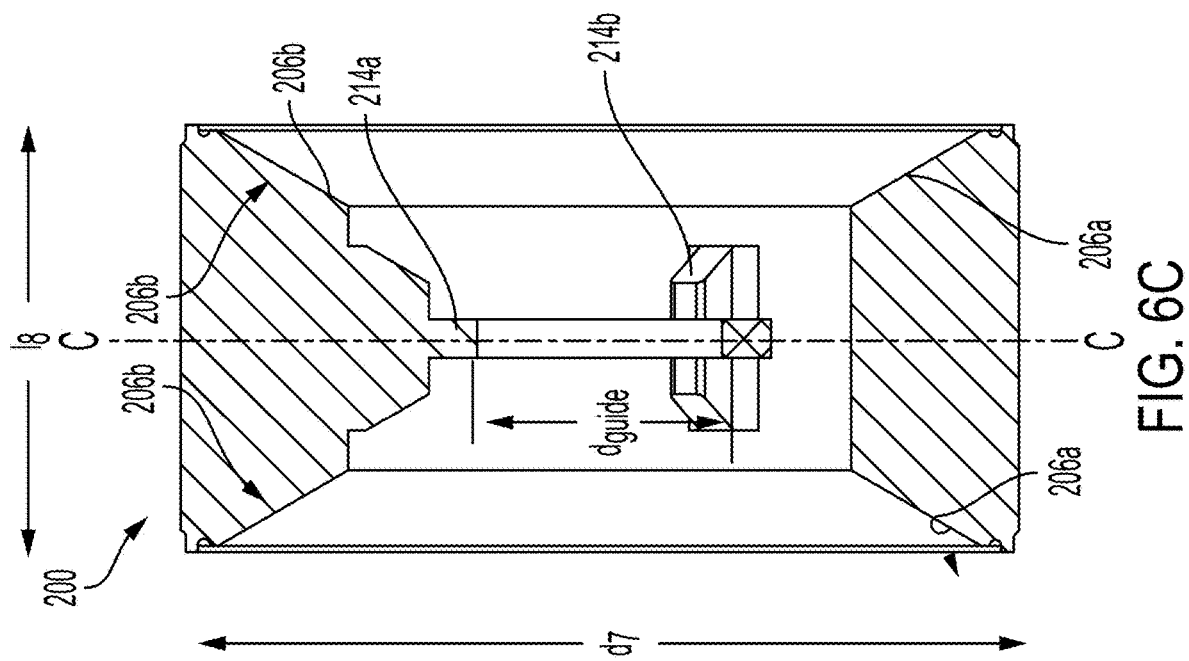
Figure 6B:
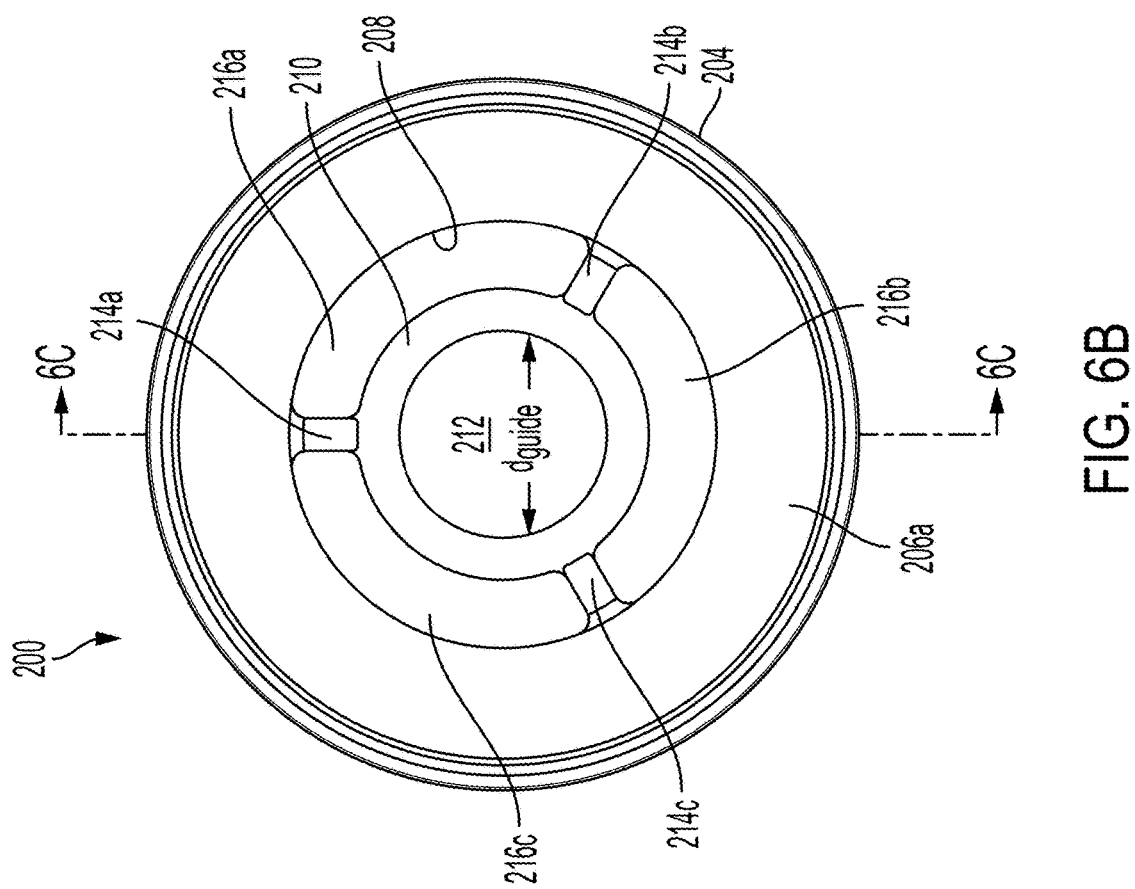

The valve seat 200 is detailed more precisely in FIGS. 6A-6C, where the valve seat 200 is represented isolated in perspective, plan, and cross-sectional views. The valve seat 200 is somewhat tubular having a circular outer surface 202 with a diameter $d_7$. Adjacent the outer surface 202 is a rim 204, which marks the transition between outer surface 202 and an angled contact surface 206a. The angled contact surface 206a forms a concave seat surface sloping inwards toward, and is contiguous with, an interior axial surface 208. From the angled contact surface 206a, through the interior axial surface 208, and to an opposite angled contact surface 206b, the valve seat 200 exhibits an axial length $l_8$. The interior axial surface 208 is parallel with the exterior surface 202 but shorter in axial length.

FIG. 6B is a plan view of the valve seat 200 with a vantage point looking down the fluid passageway, while FIG. 6C is a cross-sectional view of FIG. 6B along cut line 6C-6C. Indeed, along line 6C-6C, the valve seat 200 demonstrates a dimension of symmetry. As best seen in FIG. 6C, the valve seat 200 is also symmetrical about an axial center line C-C.

Yet further exhibited is a central ring 210 defining a central opening 212. The fluid passageway extends through and around the central ring 210. The central opening 212 has a diameter $d_{guide}$. The central ring 210 is annularly spaced from the axial surface 208 by three equally spaced radial spokes 214a-c. However, it should be understood that the current disclosure does not require three individual spokes 214a-c to space the central ring 210 from the axial surface 208, and, in the same vein, embodiments of the central ring 210 do not necessarily need to be annularly spaced from the axial surface 208 at all. The spokes 214a-c and central ring 210 define three arcuate flow slots 216a-c enabling additional fluid flow therethrough.

Referring again to FIG. 3, the bidirectional excess flow valve 100 also includes a valve shutoff element assembly 300. The valve shutoff element assembly 300 comprises two interconnected shutoff elements 302a-b. Preferably, the shutoff elements 302a-b are identical but could also be uniquely configured. FIGS. 7A-7D show a single shutoff element 302 isolated in a perspective view, side plan view, an enlarged detailed, sectioned, plan view, and a front plan view respectively. Each shutoff element 302 has a cup portion 304 that includes a convex sealing surface 306, which is complimentary in shape with the angled contact surfaces 206a-b of the valve element 200. The cup portion 304 is preferably a softer flexible material that can easily provide a fluid tight seal.

The shutoff element 302 also includes a clasping mechanism 308 extending axially and centrally from the convex sealing surface 306 of the cup portion 304. The clasping mechanisms 308 of the two shutoff elements 302a-b are designed to snap fit together. Each clasping mechanism 308 includes a central base 310 and a pair of opposing deflectable arms 312 extending from the central base 310. Each arm 312 has a distal hook 314 forming an angle between an angled bank surface 316 and a capture surface 318.

Each arm 312 further includes an intermediate boss 320. Each boss 320 extends toward the other boss 320, therefore forming a capture hollow 322 adjacent the base 310 and between the arms 312. Each boss 320 also includes complimentary banking surfaces 326. When interconnected, the distal hooks 314 of a first shutoff element 302a are captured in the capture hollow 322 of a second shutoff element 302b, while the distal hooks 314 of the second shutoff element 302b are captured in the capture hollow 322 of the first shutoff element 302a.

Figure 7A:
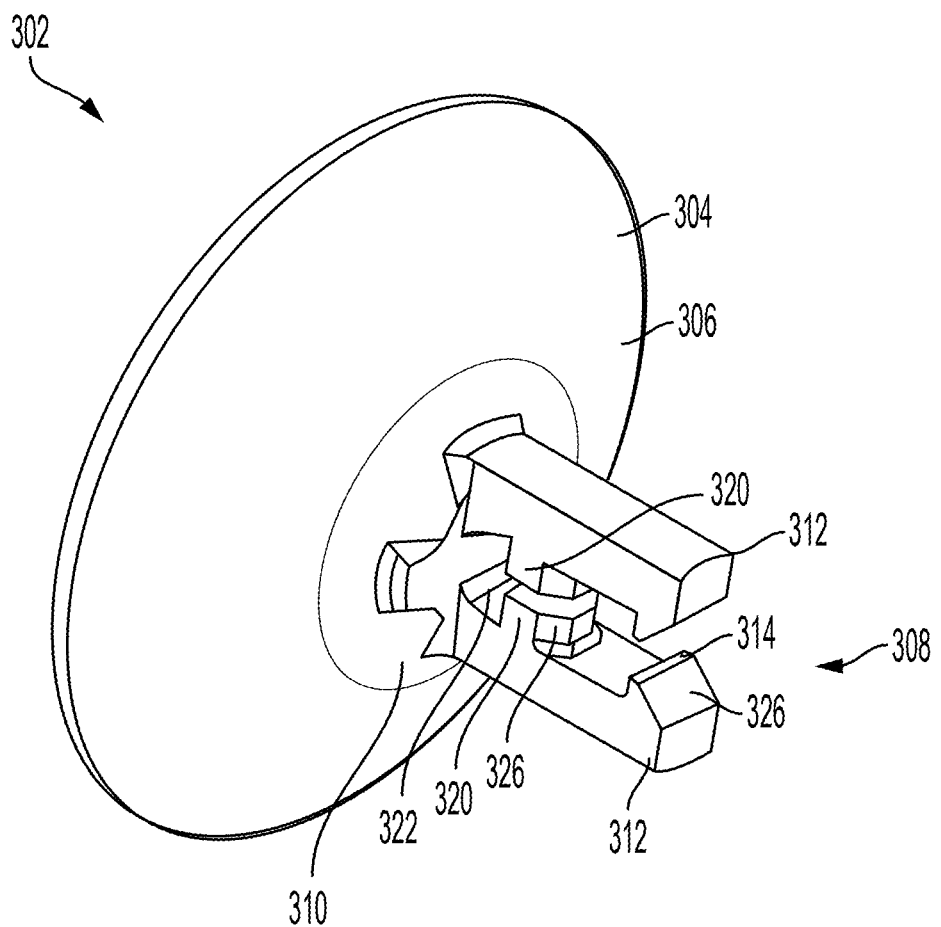
FIGS. 7A-7D show an isolated perspective view, side plan view, an enlarged detailed side plan section view, and a front plan view of a shutoff element, which is a portion of a valve element assembly of the bidirectional excess flow valve in accordance with the subject technology.
Figure 7C:
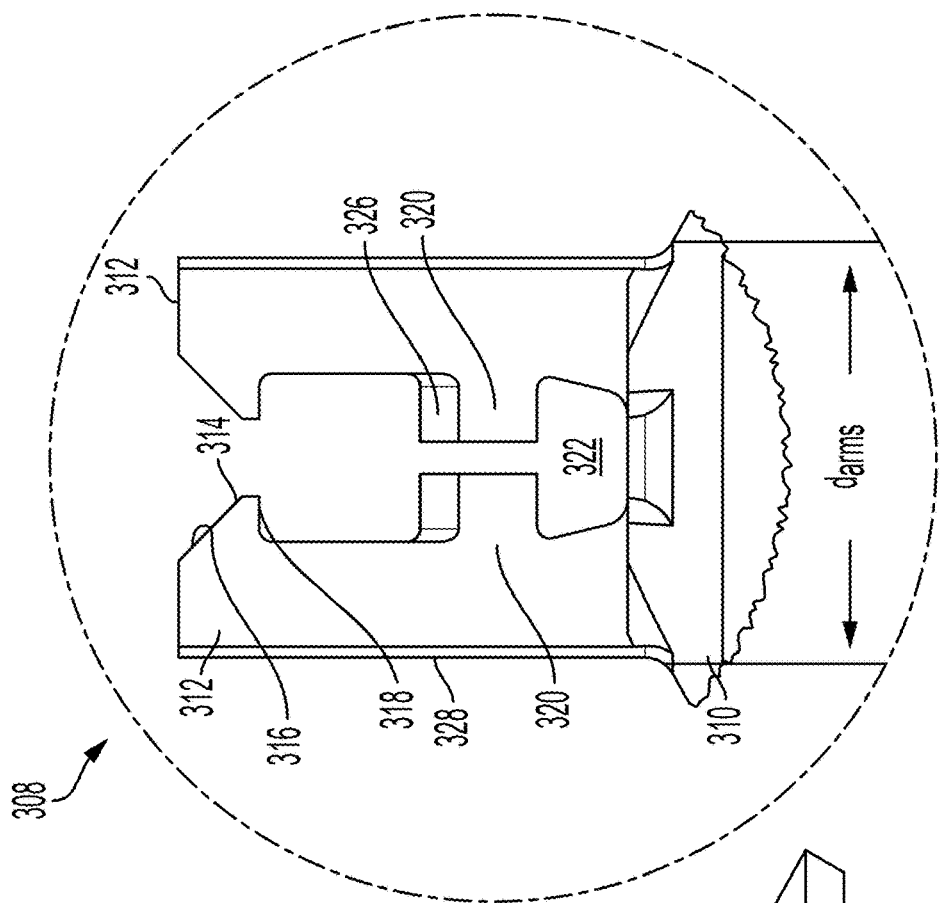
Figure 7B:
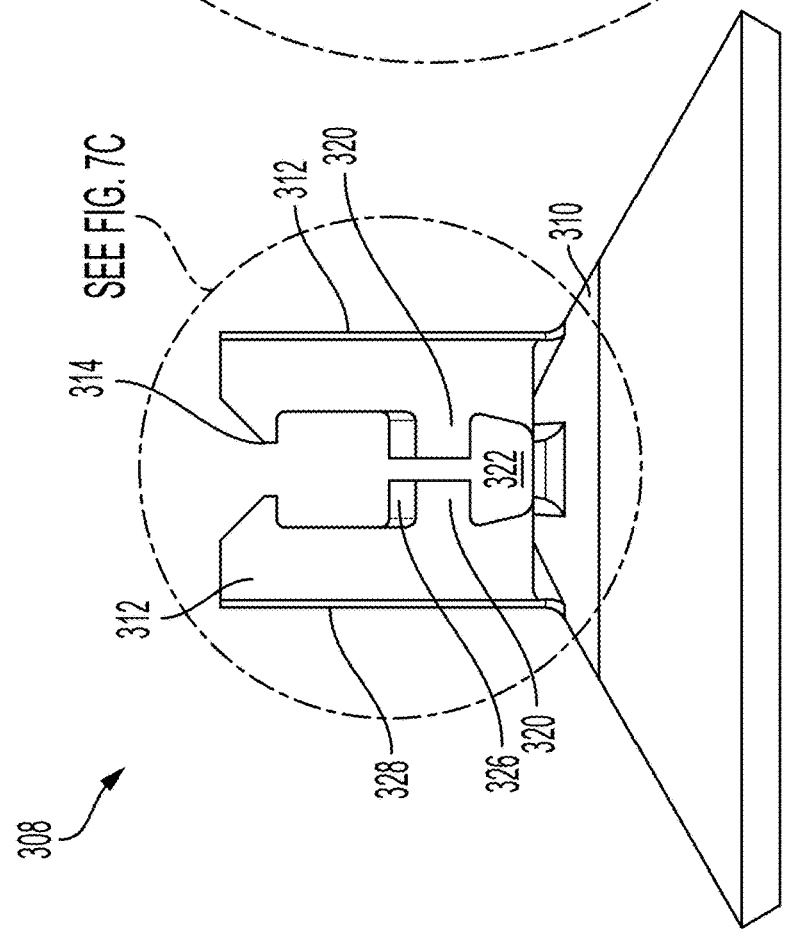
Figure 7D:
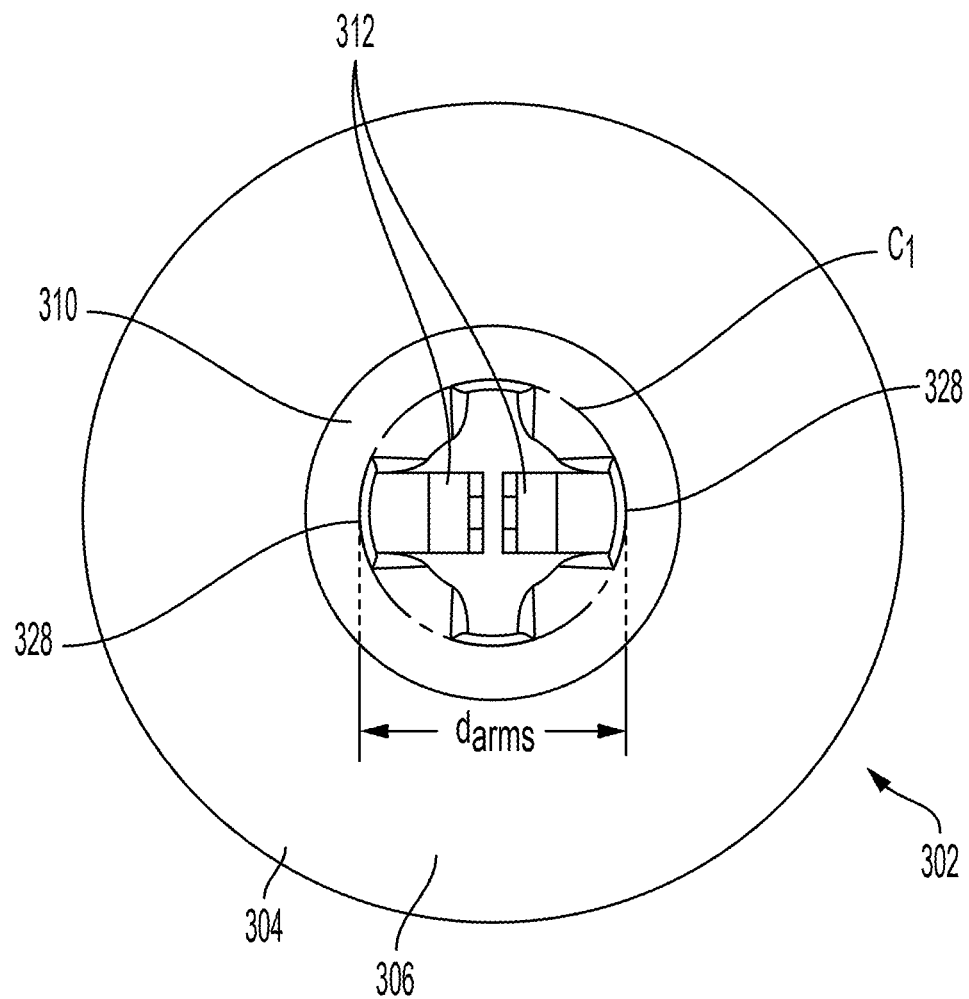

Referring to FIGS. 7C and 7D specifically, the radially outward exterior surface 328 of each arm 312 is rounded. In this sense, collectively in transverse cross-section, the exterior surfaces 328 of each arm 312 approximately forms segments of a circle $c_1$. Further, the distance $d_{arms}$ between radially outward exterior surface 328 of opposing arms 312 substantially corresponds with the diameter $d_{guide}$ of the central opening 212 of the valve seat 200 of FIG. 6A-6C so that the arms 312 can extend snugly and slideably but not restrictively through the central opening 212 of the valve seat 200.

Figure 8:
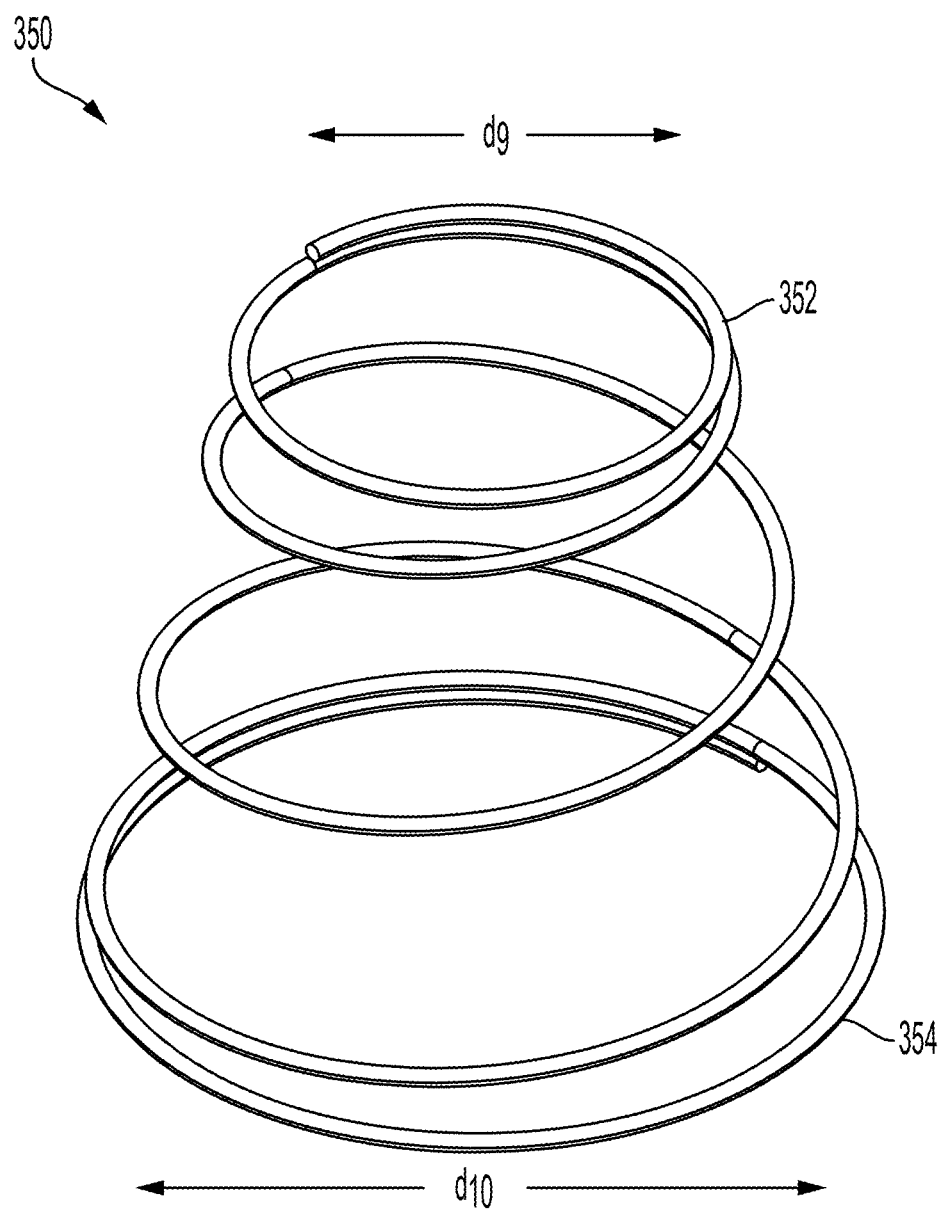
FIG. 8 shows a spring in perspective view serving as a further piece to the valve element assembly of the bidirectional excess flow valve in accordance with the subject technology.

Referring now to FIGS. 3 and 8, one of the two springs 350 is shown isolated in perspective, serving as a further piece to the valve element assembly 300. The springs 350a-b are preferably identical but need not be. Each spring 350 tapers outward from a minor end 352 having a first diameter $d_9$ to a major end 354 having a second diameter $d_{10}$. The first diameter $d_9$ is slightly larger than the distance $d_{arms}$ of the arms 312a-b of the shutoff elements 302a-b. Owning to this detail, the spring 350 can wrap around the clasping mechanism 308 of a shutoff element 302 and rest against the base 310 thereof, encircling the arms 312a-b. Further, the second, larger, diameter $d_{10}$ of the spring 350 is larger than the diameter $d_{guide}$ of the central opening 212. In this regard, the major end 354 of the spring 350 can rest against the central ring 210 and/or the spokes 214a-c. As can be seen, the springs 350 are sized and shaped to be compressed between the cup portions 304 of the arms 312a-b and the central ring 210 and/or spokes 214a-c of the valve seat 200.

To assemble the valve 100, and referring still to FIG. 3, the springs 350a-b are slipped around the clasping mechanism 308 of two shutoff elements 302a-b, respectively, such that the minor ends 352 rest against the base 310 thereof, encircling the arms 312a-b. The shutoff elements 302a-b, with the springs 350a-b wrapped therearound, are positioned on opposite sides of the valve seat 200, with the sets of arms 312a-b in line with the flow axis a, with the convex sealing surface 306 of each shutoff facing one another and their respective angled contact surface 206a-b of the valve seat 200. The shutoff elements 302a-b are oriented in rotation about the flow axis a roughly 90 degrees with respect to each other. For example, one shutoff element 302 is rotated 90 degrees clockwise or counterclockwise relative to the other 302 while ensuring that the arms 312a-b of each element 302a-b are still in line with the flow axis a.

Each shutoff element 302a-b is then interconnected by passing the arms 312a-b through the central opening 212 of the valve seat 200, with the cup portions 304 still on opposite sides of the valve seat 200. As the shutoff elements 302a-b are pressed together, the distal bank surfaces 316 contact and slide against the complimentary banking surface 318 of the opposing bosses 320. As a result, the arms 312a-b temporarily deflect radially outward during the connection process until the distal hooks 314 snap into the capture hollows 322.

When connected, the distal hooks 314 of a first shutoff element 302a are captured in the capture hollow 322 of a second shutoff element 302b, while the distal hooks 314 of the second shutoff element 302b are captured in the capture hollow 322 of the first shutoff element 302a. The major ends 354 of the springs 350a-b rest against the central ring 210 and/or the spokes 214a-c of the valve seat 200. The minor ends 352 of the springs 350 rest against the central bases 310 of the shutoff elements 302a-b.

Springs 350 of appropriate constant and length are utilized in order to keep the convex sealing surface 306 of each shutoff 302a-b axially distanced from the angled contact surfaces 206a-b of the valve seat 200 along flow axis a such that the convex sealing surfaces 306 and angled contact surfaces 206a-b do not mate under normal operating conditions. In other words, the springs 350 bias the convex sealing surfaces 306 away from the angled contact surfaces 206a-b to allow flow around the shutoff elements 302a-b and through the valve seat 200. Thus, the opposing forces from the springs 350a-b are carefully balanced.

In consequence of the curvature in the exterior surface 328 of each arm 312a-b, and the distance $d_{arms}$ between the arms 312a-b, the arms 312a-b of each shutoff element 302a-b snugly fit within the central opening 212 of the valve seat 200. Thus, the central opening 212 of the central ring 210 guides axial motion of the valve element assembly 300 so that the valve element assembly 300 moves smoothly and linearly with minimal wobbling that creates and maintains a centering effect With the shutoff elements 302a-b, springs 350a-b, and valve seat 200 attached as a sub-assembly, the female 104a and male 104b housing portions are brought together on either side of the valve seat 200, still in line with the flow axis a. To do so, the sub-assembly is inserted into the female housing portion 104a, and the threaded exterior section 128 of the male housing portion 104b is mated and screwed with the threads of the interior proximal region 118 of the female housing portion 104a.

Through this operation, the valve seat 200 is fixed in the interior proximal region 136 formed by the male 104b housing portion, and the proximal opening 116 formed by the female 104a housing portion. The valve seat 200 is approximately centrally fixed because the axial length $l_3$ of the interior proximal region 136 of the male 104b housing portion summed with the length $l_1$ of the proximal opening 116 approximates to the axial length $l_7$ of the valve seat 200. Additionally or alternatively, to fix the valve seat 200 in place, the outer surface 202 of the valve seat 200 with a diameter $d_7$ corresponds with the fourth inner diameter $d_4$ of the interior proximal region 136 of male 104b housing portion and or the diameter $d_1$ of the proximal opening 116 formed by the female 104a housing portion so that the housing 102 effectively wraps tightly around the valve seat 200 to fix the valve seat 200 in place.

When the valve seat 200 is fixed in place, the cup portions 304 of the shutoff elements 302a-b extend into the intermediate regions 124, 140 as the bias from the springs 350a-b is balanced. As the intermediate regions 124, 140 have larger diameters $d_2$, $d_5$ than the cup portions 304, the cup portions 304 can freely slide axially in the intermediate regions 124, 140. The axial length $l_4$ of the intermediate regions 124, 140 is sufficient to allow the shutoff elements 302a-b to travel in either direction, right or left, against the opposing angled contact surface 206a-b of the valve seat 200.

Referring back to FIG. 2, the reverse excess flow valve 100 is shown in cross section. The valve shutoff element assembly 300, including the first and second shutoff elements 302a-b and spring 350a-b, extends through the valve seat 200. Both shutoff elements 302a-b are normally biased away from the valve seat 200 by balancing of force from the springs 350a-b, which can be seen is an open position to allow flow through the fluid passageway of the valve 100 in either direction.

In operation, during a normal flow conditions from inlet 104a to outlet 104b in FIG. 2, the first and second shutoff elements 302a-b are biased away from the valve seat 200 by the first and second springs 350a-b. Thus, flow is permitted through the fluid passageway from inlet 104a to outlet 104b without obstruction. If the valve 100 is installed inadvertently reversed or flow is reversed in the fluid network, normal flow from right to left, that is from outlet 106b to inlet 106a, is the same in that flow similarly passes from outlet 106b to inlet 106a without obstruction.

During an excess flow condition, where the pressure of the fluid flow exceeds a predetermined level in either direction, the flow of fluid will close the bidirectional excess flow valve 100. The predetermined level is derived based on spring force, size of the cup portions 304 of the shutoff elements 302a-b, the intermediate 124, 140 and interior proximal regions 118, 136 of the both the male and female housing portions 104a-b, and other factors. The typical pressure for an external fluid network to which the bidirectional excess flow valve is connected can be determined in advance so the aforementioned valve parameters can be tuned for use in specific applications.

Nonetheless, when the pressure of the fluid flow exceeds the predetermined level, the pressure of fluid flow overcomes the bias of the first spring 350a against the first shutoff element 302a and therefore urges the first shutoff element 302a against the valve seat 200. For example with reference to FIG. 2, excess flow from left to right causes the first shutoff element 302a to move to the right until the first shutoff element 302a seals against the corresponding angled contact surface 206a-b to close the fluid passageway. Similarly, excess flow from right to left causes the second shutoff element 302b to move to the left until the second shutoff element 302b seals against the corresponding angled contact surface 206a-b to close the fluid passageway. Thus, the valve 100 performs the same whichever way the flow passes without operational failure.

More specifically, because the radially outward exterior surface 328 of each arm 312a-b is rounded, forming segments of a circle in transverse cross-section, and further because the distance $d_{arms}$ between the radially outward exterior surface 328 of opposing arms 312a-b substantially corresponds with the diameter $d_{guide}$ of the central opening 212 of the valve seat 200, the pressure of the fluid flow urges first shutoff element 302a to slide into the central opening 212 of the valve seat 200 along the radially outward exterior surface 328 of each arm 312a-b until the first shutoff element 302a abuts the valve seat 200. As such, the convex sealing surface 306 seals with the angled contact surface 206a-b of the valve seat 200 to obstruct fluid from permeating from inlet 106a to outlet 106b when under pressure.

Similarly, if reversed, the flow of fluid will close the bidirectional excess flow valve 100. There, pressure of the fluid flow overcomes the bias of the second spring 350b against the second shutoff element 302b and therefore urges the second shutoff element 302b against the valve seat 200.

More specifically, because the radially outward exterior surface 328 of each arm 312a-b is rounded, forming segments of a circle in transverse cross-section, and further because the distance $d_{arms}$ between the radially outward exterior surface 328 of opposing arms 312a-b substantially corresponds with the diameter $d_{guide}$ of the central opening 212 of the valve seat 200, the pressure of the fluid flow urges the second shutoff element 302b to slide into the central opening 212 of the valve seat 200 along the radially outward exterior surface 328 of each arm 312a-b until the second shutoff element 302b abuts the valve seat 200. As such, the convex sealing surface 306 seals with the angled contact surface 206a-b of the valve seat 200 to obstruct fluid from permeating from outlet 106b to inlet 106a when under pressure.

Upon returning from an excess flow condition, that is, returning to normal flow where the pressure of the fluid flow does not exceed the predetermined level, the bidirectional excess flow valve 100 will reopen. There, the bias of the first spring 350a against the first shutoff element 302a surmounts the pressure of fluid flow. The first spring 350a causes the first shutoff element 302a to move away from the angled contact surface 206a-b to open the fluid passageway. Similarly, in the reverse direction, the bias of the second spring 350b causes the second shutoff element 302b to move away from the angled contact surface 206a-b to open the fluid passageway.

In one embodiment, the valve seat 200 or other components can be formed of a material that expands upon exposure to high heat to close the valve. For example, the valve seat 200 may be an ethylene co-polymer-based, expandable sealant that expands at between 350° F.-425° F. Thus, the valve seat 200, including any of the central ring 210, spokes 214a-c, angled contact surfaces 206a-b, and/or interior axial surface 208 can expand to stop fluid flow when exposed to extreme temperatures and the valve seat 200 reaches 350° F.-425° F. As a result of the expansion, the valve shuts down automatically as a result of high heat (e.g., a dangerous fire event) and may thereafter necessitate a replacement.

In another embodiment, the valve is not reversible as the valve shutoff element includes only a first cup portion with several, preferably two to four, arms that extend into the central opening. The arms can have distal hooks that snap fit to the central opening to prevent removal from the central opening of the ring while still guiding the axial movement. In still another embodiment, the valve seat simply necks down to the central opening.

As can be seen from review of the subject disclosure, the technology herein provides a bidirectional valve. The technology also discloses components that are easy to manufacture and assemble, like the snap fit arms, yet function uniquely well. It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., valve elements, connection mechanisms, spring assemblies, and the like) shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

What is claimed is:

1. A bidirectional excess flow valve for automatically stopping delivery of a fluid from a supply in a fluid network comprising:
   a housing defining an interior forming a fluid passageway along a flow axis between a first opening and a second opening;
   a valve seat in the interior, the fluid passageway extending through the valve seat; and
   a valve element assembly including a first shutoff element and a second shutoff element disposed on opposite sides of the valve seat, wherein the first and second shutoff elements are normally biased set apart from the valve seat assembly in an open position to allow flow through the fluid passageway, wherein:
- in a first closed position, the first shutoff element is configured to move against the valve element assembly to close the fluid passageway when flow through the fluid passageway from the first opening to the second opening exceeds a first predetermined level; and
- in a second closed position, the second shutoff element is configured to move against the valve element assembly to close the fluid passageway when flow through the fluid passageway from the second opening to the first opening exceeds a second predetermined level.

2. The bidirectional excess flow valve of claim 1, wherein:
the first shutoff element defines a first convex exterior surface;
the second shutoff element defines a second convex exterior surface; and
the valve seat defines a first concave seat surface opposing a second concave seat surface with the first convex exterior surface facing the first concave exterior surface and the second convex exterior surface facing the second concave exterior surface.

3. The bidirectional excess flow valve of claim 1, wherein the valve element assembly includes a clasping mechanism configured to snap fit the first and second shutoff elements together.

4. The bidirectional excess flow valve of claim 3, wherein the clasping mechanism includes:
- a first pair of opposing deflectable first arms extending from the first shutoff element, each first arm having a distal hook and an intermediate boss defining a first capture hollow adjacent the first shutoff element; and
- a second pair of opposing deflectable second arms extending from the second shutoff element, each second arm having a distal hook and an intermediate boss defining a second capture hollow adjacent the second shutoff element so that the distal hooks of the first pair are selectively captured in the second capture hollow and the distal hooks of the second pair are selectively captured in the first capture hollow.

5. The bidirectional excess flow valve of claim 4, wherein the first and second pair of arms form radially outward curved surfaces that approximately form part of a circle in transverse cross-section.

6. The bidirectional excess flow valve of claim 5, wherein: the valve seat includes a central ring defining a central opening through which the fluid passageway and the first and second pair of arms extend; and the central ring guides axial motion of the valve element assembly by the central opening being approximately a same size as the circle.

7. The bidirectional excess flow valve of claim 6, further comprising: a first spring extending between the valve seat and the first shutoff element to bias the first shutoff element in the open position; and a second spring extending between the valve seat and the second shutoff element to bias the second shutoff element in the open position, wherein the ring serves as a stop for the first and second springs and the first and second springs bias reopen the bidirectional excess flow valve upon the flow falling below the first and second predetermined levels, respectively.

8. The bidirectional excess flow valve of claim 1, wherein the valve seat is formed of an ethylene co-polymer-based material that expands at high temperature to close the fluid passageway.

9. An excess flow valve for automatically stopping delivery of a fluid from a supply in a fluid network comprising:
- a housing defining an interior forming a fluid passageway along a flow axis;
- a valve seat fixed in the interior and forming a central opening, wherein the fluid passageway extends through the central opening;
- a first and second shutoff element for selectively sealing against the valve seat to block the fluid passageway, the first and second shutoff elements connected together by a clasping mechanism and retained in the central opening, the first and second shutoff elements sized and configured to guide axial motion of the valve element; and
- two springs extending between the valve seat and each shutoff element for normally biasing the shutoff elements away from the valve seat in an open position to allow flow through the fluid passageway,
wherein in a closed position, the first or second shutoff element is configured to move against the valve element assembly to close the fluid passageway when flow through the fluid passageway exceeds a predetermined level.

* * * * *